Figure 1:
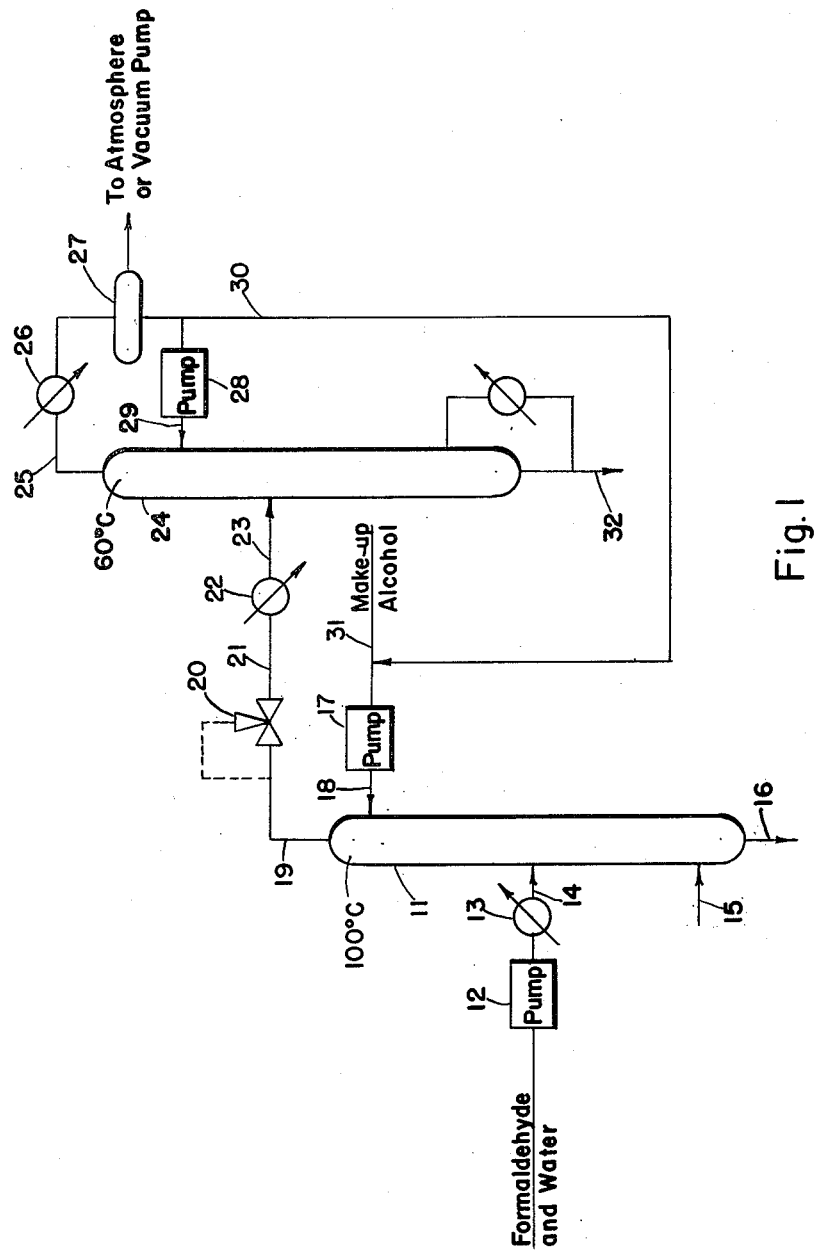

Patented Oct. 5, 1954

2,690,994

UNITED STATES PATENT OFFICE 2,690,994

FORMALDEHYDE PURIFICATION BY USE OF ALCOHOLS

James F. McCants, Tulsa, Okla.

Application February 1, 1950, Serial No. 141,826

6 Claims. (Cl. 202—42)

This invention relates to the purification of formaldehyde and more particularly to the separation of formaldehyde from mixtures thereof with water.

In most commercial processes for the manufacture of formaldehyde, a large quantity of water is simultaneously produced, together with smaller quantities of various organic impurities, such as aldehydes, acids, acetals, alcohols, ketones and the like. The isolation of formaldehyde from the crude reaction product is an important and difficult undertaking, particularly when the formaldehyde is produced by certain processes, such as the oxidation of gaseous petroleum fractions, in which the crude formaldehyde is obtained in relatively dilute aqueous solution together with a relatively high proportion of organic impurities. Various methods have been disclosed in the prior art for effecting the desired separation and purification. For example, by distilling a solution of formaldehyde and subjecting the vaporous distillate to partial condensation, an overhead product enriched in formaldehyde content may be obtained. In actual practice, however, it has never been possible to achieve more than a partial concentration and purification of formaldehyde in this way, and serious trouble is generally encountered from the formation of solid formaldehyde polymers in excessive amounts on the cool surface of the partial condenser. Another method involves the use of vacuum distillation to remove water and low-boiling organic impurities overhead, leaving a formaldehyde concentrate in the distillation bottoms. This method is incapable of removing such impurities as acetic and formic acids and dissolved inorganic compounds. In another process, an azetroping agent, such as ethyl acetate, is used to distill water out of the aqueous formaldehyde solution. This method is capable of giving a more nearly anhydrous formaldehyde product; but like vacuum distillation, it is incapable of separating non-volatile impurities. Pressure distillation is a highly advantageous method, in that the formaldehyde is collected as an overhead product; thus, relatively dilute solutions may be processed economically because of the low heat requirements of the process. Unfortunately, however, adequate fractionation is not feasible, owing to the fact that a liquid formaldehyde reflux cannot be provided. Moreover, the utility of the process is limited by the fact that the excessively high temperatures required for efficient pressure distillation tend to destroy much of the formaldehyde An object of this invention is to provide a superior means for purifying and concentrating aqueous formaldehyde solutions. Another object of my invention is to provide a method for selectively removing formaldehyde from mixtures thereof with water. A still further object of my invention is to prepare a solid polymeric form of formaldehyde having desirable mechanical properties and high water solubility. Other objects of my invention and its advantages over the prior art will be apparent from the following description and examples.

Broadly my invention comprises distilling an aqueous solution of formaldehyde and contacting the resulting vapors at a temperature in excess of about 80° C. with a liquid water-soluble alcohol forming a water azetrope boiling below the boiling point of water. Under these conditions a substantial proportion of the water vapor is condensed and is replaced in the vapors by water-soluble alcohol to yield a vaporous mixture containing formaldehyde in increased ratio to water. The vaporous mixture can be condensed and cooled to cause precipitation of formaldehyde polymer, or it can be passed, with or without condensation to a second distillation step in which the alcohol-water azeotrope is distilled away from a concentrated aqueous formaldehyde solution at a temperature below about 80° C. If desired the second distillation can be employed to remove the water overhead leaving a concentrated alcohol solution of formaldehyde which can be used as such, or from which a substantially anhydrous alcohol-containing polymer can be precipitated by cooling.

Figure 2:
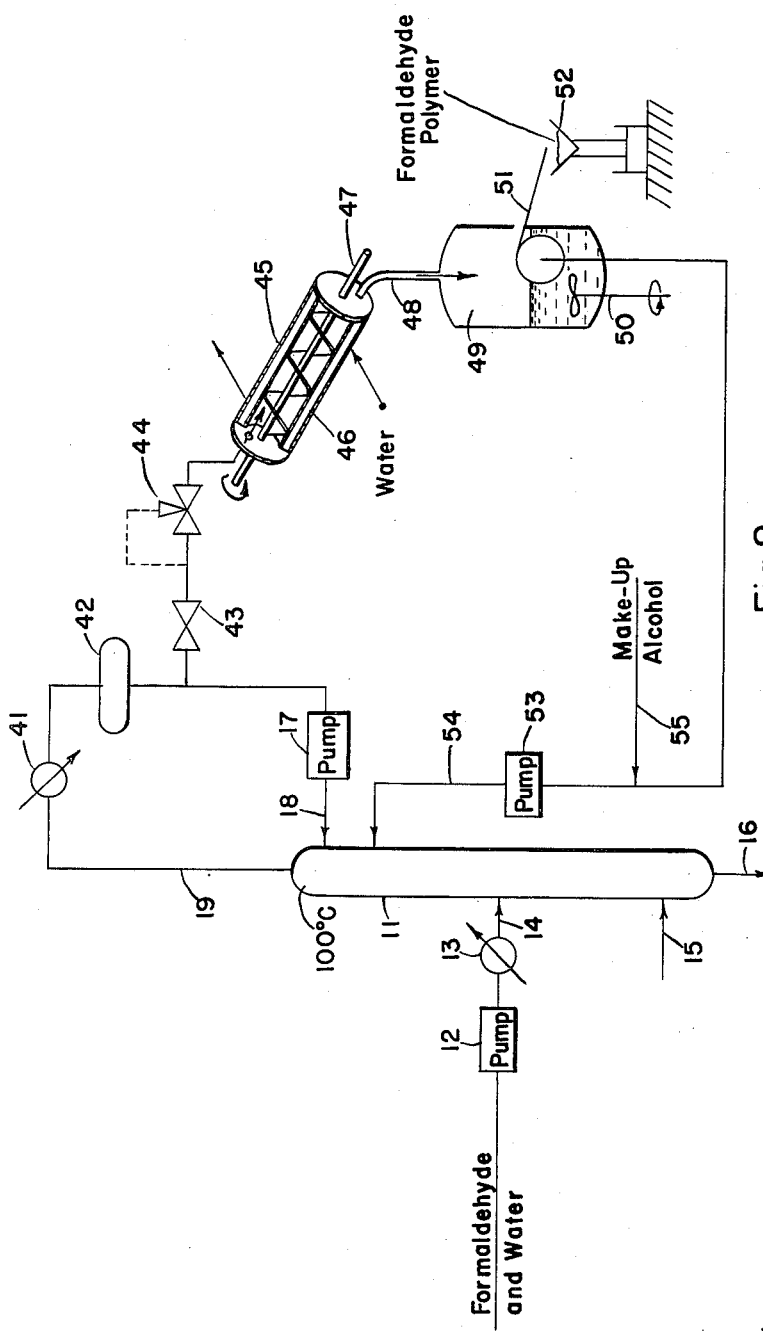

My invention will be better understood from a description of the drawing. In the drawing, Figure 1 is a flow diagram of a process for producing concentrated aqueous solutions of formaldehyde. Figure 2 is a flow diagram of a process for producing solid formaldehyde polymer. In both flow diagrams a feed stream of formaldehyde and water is introduced into fractionating column 11 by means of pump 12 through heater 13 and line 14. For reasons which will be explained later this stream preferably is completely vaporized in heater 13 and enters column 11 as a vapor. The vapors of formaldehyde and water rise upwardly through column 11 and are met by a downwardly flowing stream of water-soluble alcohol or suitable ether alcohols (hereinafter referred to as alcohols) added as reflux. Preferably the alcohol employed is a completely water-miscible compound such as, for example, ethanol, isopropanol, normal propanol, tertiary butanol or methyl Cellosolve. As a result of the reflux a portion of the water is condensed and a portion of the alcohol is vaporized. The alcohol may be introduced into column 11 in the feed or at any other point in the column. Preferably, however, it is introduced into the top of the column, or at least above the feed plate.

Below the feed plate in column 11 the temperature is maintained above about 100° C. This elevated temperature causes rapid decomposition of the formaldehyde polymers and hydrates. The resulting monomeric formaldehyde escapes from the water on the trays of the stripping section and rises into the zone of the column above the feed plate. The water flows downwardly through the stripping section, becoming poorer in formaldehyde concentration as it flows down the column until it is withdrawn through line 16 as a substantially formaldehyde-free stream.

Heat is conveniently added to column 11 by means of open steam introduced through line 15. In prior art processes this convenient use of open steam is not possible since the bottoms stream always contains formaldehyde. Open steam would result in further dilution of this stream. In my process, however, the stream withdrawn through line 16 is substantially free from formaldehyde and, accordingly, the addition of open steam is not objectionable.

In the top part of the fractionating column a separation is made between water and an azeotrope of the alcohol with water at temperatures above about 80° C. and preferably at about 100° C. as shown in the drawing. The formaldehyde remains principally in the vapor phase and passes out the top of column 11 with the azeotrope of the alcohol and water through line 19. To this stage in my process Figures 1 and 2 are identical. From this point, however, they differ.

In Figure 1 the vapors pass through line 19 and pressure-control valve 20. Pressure-control valve 20 is provided to control the pressure in column 11 in order to regulate the boiling point of the alcohol-water azeotrope to insure that the temperature in the distilling column remains above about 80° C. The pressure and corresponding temperature which can be employed are limited at the upper end of the range only by the permissible amount of formaldehyde decomposition. The amount of decomposition becomes serious at temperatures above about 120° C. in solutions containing more than about 30 percent by weight of formaldehyde, while decomposition becomes serious only above about 150° C. in solutions containing less than about 5 percent by weight of formaldehyde. The vapors pass at reduced pressure through line 21 to cooler 22 where they are preferably condensed for reasons which are given later.

The cooled vapor or condensed liquid is introduced through line 23 to column 24. The pressure in column 24 is maintained at such a level that the temperatures in this column remain below about 80° C., preferably at about 60° C. as shown. The temperature should be maintained above about 40° C. simply to prevent freezing of the liquid and excessive precipitation of formaldehyde polymer. Under these conditions the alcohol-water azeotrope is taken overhead substantially free from formaldehyde and the formaldehyde is withdrawn from the bottom of the column through line 32 together with any excess water or alcohol over the amount required to form the alcohol-water azeotrope.

If an aqueous solution of formaldehyde is desired, water may be added to column 24 to give a bottoms product of the proper concentration of formaldehyde in water. If an anhydrous solution of formaldehyde in the alcohol is desired, an excess of the alcohol may be added to column 24 to distill off all the water as an alcohol-water azeotrope and produce a substantially anhydrous stream of formaldehyde in alcohol as a bottoms product. If the alcohol-water azeotrope boils so close to the boiling point of the alcohol that separation of the alcohol from the alcohol-water azeotrope is difficult, as in the case of ethanol, isopropanol or tertiary butanol, a hydrocarbon such as benzene or hexane may be added to column 24 to form the ternary hydrocarbon-alcohol-water azeotrope which can be easily separated from excess alcohol added to or remaining in the column. No hydrocarbon is required, however, if normal propanol is employed as the alcohol.

Although column 24 operates best on the overhead from column 11, it will be apparent that this column will act alone to separate formaldehyde from water and produce as a bottoms stream a substantially anhydrous solution of formaldehyde in alcohol.

The alcohol-water azeotrope is taken overhead through line 25, condensed in cooler 26 and passes to reflux drum 27. A portion of the liquid from this reflux drum may be returned to column 24 through pump 28 and line 29 as reflux, the remainder of the liquid is recycled through line 30 to the intake of pump 17 which returns the alcohol to column 11 as reflux. Make-up alcohol may be introduced through line 31 to the intake of pump 17 as desired.

I believe the theory of my process to be as follows, although it will be understood that my invention is not limited thereto. The theory is based principally upon the peculiar behavior of formaldehyde. In the presence of water at room temperature the formaldehyde undergoes several reactions. In the first place, it forms a hydrate with water; second, molecules of formaldehyde react with each other to form polymers; and third, the hydrate monomers react together to form polymeric hydrates. Other reaction may also take place but these three appear to be the principal ones. As the temperature of a water-formaldehyde mixture is increased two effects are observed. First, there is a tendency for the formaldehyde and formaldehyde hydrate polymers to depolymerize to the respective monomeric forms and a tendency of the monomeric hydrate to decompose into formaldehyde and water. At low temperatures the rates of reactions are rather slow. At more elevated temperatures, however, the second effect is observed. The second effect of elevated temperatures is a considerably increased rate of depolymerization of the polymers and of dehydration of the hydrate. It is to take advantage of these effects that the feed is introduced into column 11 preferably as a vapor and into column 24 preferably as a fairly cool liquid.

If the feed to column 11 is in the vapor state all the formaldehyde must be present in the monomeric unhydrated form. Therefore, no time is required in column 11 for polymers and hydrates to decompose to give the monomeric form. Since the alcohol-water azeotropes normally boil substantially below the boiling point of water only a few fractionating plates are required to afford separation of the azeotrope from substantially all excess water. During the time required for the vaporous feed to pass through these few plates little opportunity is afforded for combination of the formaldehyde monomer with water or for polymerization of the formaldehyde or of the hydrate. If the feed to column 24 is in the liquid state and is fairly cool, most of the formaldehyde will be present as a monomeric hydrate or as a formaldehyde polymer or as a hydrate polymer. Since the separation of the alcohol-water azeotrope from excess water in column 24 can be made to take place rather rapidly little opportunity is afforded for the depolymerization and dehydration of formaldehyde, which are rather slow reactions below about 80° C., to take place in this column. Consequently, most of the formaldehyde can be withdrawn through line 32 from the bottom of column 24 as an aqueous solution in the excess water. In case it is desired to withdraw a substantially anhydrous solution of formaldehyde in alcohol from the bottom of column 24, enough heat must be employed in the bottom of column 24 to insure breakdown of formaldehyde hydrates.

It will be understood that while a vapor feed for column 11 and a liquid feed for column 24 are greatly preferred and facilitate the operation of these columns, both columns will function with either a liquid or vapor feed. The more critical factor is the temperature in the column. The high temperature employed in column 11 insures that the equilibrium between monomeric formaldehyde and its reaction products is shifted far over to the direction of the monomer and that the rate of reaction is increased so that as some of the monomer is stripped out of the water solution additional monomer is rapidly formed. In column 24, on the other hand, the low temperature insures that the equilibrium of the monomer with its reaction products is shifted in the direction of the reaction products so that little formaldehyde monomer is available for vaporization and escape up the column. The small amount of monomer which escapes in this manner, however, dissolves in the water present in the liquid on the trays and forms a hydrate or polymer which is carried back down the column. Formaldehyde emerging from the top of column 24 through line 25 is dissolved in the liquid in cooler 26 and is returned to column 11 through line 30.

In the process shown in Figure 2 the operation of column 11 is the same as described in connection with Figure 1. In Figure 2, however, the mixture of formaldehyde and alcohol-water azeotrope in line 19 is condensed in cooler 41 and flows to reflux drum 42 from which a portion may be returned by pump 17 through line 18 to column 11 as reflux, whereby the concentration of formaldehyde in the overhead is increased. The explanation of this action is probably that if some of the ordinary alcohol reflux is replaced by alcohol which contains formaldehyde, the alcohol serves to reflux back water introduced in the feed, and goes overhead with the formaldehyde in the feed. Thus the ratio of reflux alcohol to formaldehyde in the feed remains constant. But if formaldehyde is present in the reflux, this formaldehyde also goes overhead, increasing the ratio of formaldehyde to alcohol in the overhead.

At least a portion of the stream from reflux drum 42 is withdrawn through control valve 43 and pressure-reducing valve 44 to cooler 45 which is maintained at a temperature sufficiently low to cause precipitation of formaldehyde polymer. This polymer is scraped from the walls of cooler 45 by spiral scraper 46 rotated by means of shaft 47 and falls through pipe 48 into filter 49 stirred by mixer 50. The formaldehyde polymer is scraped off the drum of filter 49 by blade 51 and is carried away as by cart 52 to storage or further processing such as passage to a drying oven where excess alcohol and water is evaporated. Alcohol and water from filter 49 are recycled by means of pump 53 through line 54 to column 11 as at least part of the reflux for this column. Make-up alcohol is introduced through line 55 into the intake of pump 53.

It will be noted that the reflux system for column 11 in Figure 2 is a high pressure system. The reason for this is to permit maintaining an elevated temperature in this system so as to insure a high solubility of formaldehyde polymer in the alcohol-water solution and thus make certain that no precipitate forms in the reflux system even though a rather high concentration of formaldehyde is taken overhead from column 11. It will be apparent, of course, that the reflux system can be operated at a lower pressure without difficulties from formaldehyde condensation in the reflux system by limiting the concentration of formaldehyde in the reflux system.

In Figure 2 the overhead from column 11 is shown as passing directly to condenser 45. It may be desirable in some instances to send this overhead stream to a second column as shown in Figure 1 in order to remove most of the alcohol which would otherwise tend to dissolve the formaldehyde polymer and reduce the quantity of polymer recovered in filter 49, or to remove water, in case an anhydrous, alcohol-containing polymer is desired. The process shown in Figure 2, without an intermediate step for removal of most of the alcohol or water from the concentrated formaldehyde solution, is in general preferred due to the greater simplicity of the system unless an anhydrous, alcohol-containing polymer is desired.

If an anhydrous, alcohol-containing polymer is desired, column 24 is operated as described above to produce an anhydrous solution of formaldehyde in alcohol as a bottoms product. This solution is then sent to cooler 45 where a polymer of formaldehyde forms. This polymer is found to contain considerable alcohol which cannot be removed by drying operations. The alcohol is chemically combined with the formaldehyde polymer. The chemical combination is probably the phenomenon which permits the alcohol to take formaldehyde down column 24 and out the bottom thereof with excess alcohol. In the polymer, the alcohol serves a very useful purpose in preventing excessive polymerization of the formaldehyde. This solid, anhydrous, alcohol-containing polymer is a unique product of considerable value in many applications. Due to the polymerization inhibiting effect of the alcohol, the solid remains highly water soluble. The polymer is particularly applicable to plastics manufacture in which a low-molecular-weight formaldehyde polymer is desirable in an anhydrous condition. Many other applications and uses of this low-molecular-weight, anhydrous formaldehyde polymer will occur to those skilled in the arts in which formaldehyde is employed.

It is in connection with the formation of formaldehyde polymer by means of the process shown in Figure 2 that the use of a water-soluble alcohol becomes highly important. When a polymer forms in cooler 45, it does so in the presence of the alcohol. It is unavoidable under such conditions that at least small quantities of the alcohol are occluded in and on the polymer. The presence of a water-insoluble material during this operation results in the coating of the small solid particles with a film of insoluble material which inhibits growth of these particles to a size suitable for filtering. In other words, the mechanical form of the precipitate produced is poor in the presence of such a substance. In addition, the coating of water-insoluble material inhibits water solubility of the resulting polymer. This inhibited water solubility can result in a rather serious disadvantage. When a water-soluble alcohol is employed, on the other hand, the liquid phase in cooler 45 is homogeneous. Thus, although the alcohol is occluded in and on the polymer particles, growth of the particles is not inhibited. As a result, the polymer particles reaching filter 49 are in a desirable mechanical form. In addition, the water-soluble alcohol in no way inhibits water solubility of the polymer. If for any reason the presence of the alcohol on the polymer is objectionable, most of this alcohol can be removed by a light water wash of the polymer.

Although complete water miscibility of the alcohol is desirable, many of the advantages of water solubility can be obtained by use of an alcohol having only partial water solubility. In general, the alcohol should be soluble to the extent of at least 15 or 20 grams per 100 grams of water at 25° C. This degree of water solubility not only insures that the alcohol will not inhibit water solubility but also will permit transfer of water and formaldehyde through any alcohol film on polymer particles in cooler 45 so that polymer particles of proper mechanical form can be produced in the cooler. Water miscibility of the alcohol is also important in the operation of column 11. It is possible to operate such a column with two liquid phases present on the plates. However, such an operation is much more unstable and difficult to control than a distillation in which only a single liquid phase appears in the column. It is greatly preferred for this reason that a completely water-miscible alcohol be employed in the process not only when a polymer is to be formed as shown in Figure 2 but also where a concentrated aqueous solution of formaldehyde is to be produced as shown in Figure 1.

An additional important effect of the low-molecular-weight, water-soluble alcohol is the inhibition of excessive polymerization of formaldehyde. In the case of aqueous formaldehyde solutions the effect is to prevent precipitation of the large polymers from the solution. Thus, in Figure 1 it is usually desirable to permit a small portion of the water-soluble alcohol to pass out of the bottom of column 24 through line 32 to inhibit excessive polymerization and precipitation of polymer from the concentrated aqueous solution withdrawn through line 32. The quantity of alcohol included in this stream will depend to a large extent upon the temperature to which the aqueous solution is to be subjected. For normal temperatures in the United States, and for reasonable periods of storage an alcohol concentration of 5–15 percent is ordinarily adequate. Low-molecular-weight alcohols which are particularly suitable for this polymerization-inhibiting effect are ethanol, isopropanol, normal propanol, and tertiary butanol. These particular alcohols are also especially desirable since they are all completely miscible with water.

My process can be combined advantageously with most prior art formaldehyde concentrating processes. The majority of these processes yield a marketable solution of formaldehyde of medium concentration but in producing this solution a second solution is produced which is less concentrated than the feed and which contains an appreciable quantity of the formaldehyde fed to the process. This dilute solution generally cannot be concentrated economically to a marketable product by prior art processes.

Since my process operates as well with dilute feeds as with concentrated feeds, the dilute solution of formaldehyde from the prior art process can be concentrated in a high-temperature alcohol-refluxed column according to my invention to produce a solution of formaldehyde in alcohol having almost any desired ratio of formaldehyde to water. This solution is then blended with the concentrated solution from the prior art process. The alcohol-water solution can be used as such, or a portion or all of the alcohol can be stripped from the aqueous formaldehyde solution at low temperature if desired before blending this stream with the stream from the prior art process.

By this combination of processes the prior art process can be operated under most economical conditions to produce a stream more concentrated than the feed, but containing considerably more water than usually appears in commercial formaldehyde solutions. My process can then be employed to recover the formaldehyde remaining in the dilute solution from the prior art process, this formaldehyde being recovered as a concentrated solution of formaldehyde in alcohol and water. The concentrations of alcohol, formaldehyde and water in the stream from my process can be regulated to provide in the blended product of the stream from my process and the stream from the prior art process the desired concentration of formaldehyde, water and polymerization-inhibiting alcohol. In this combination process the prior art procedure greatly reduces the load on the alcohol-refluxed column while the alcohol-refluxed column recovers the formaldehyde usually lost in the dilute solution from the prior art process, permitting the prior art process to be operated under optimum conditions for heat conservation and avoiding formaldehyde decomposition.

My invention will be more fully understood from the following specific examples. In all examples 100 milliliters of formaldehyde solution and 50 milliliters of the alcohol were introduced into a one liter flask equipped with an internal electric heating element regulated by means of an adjustable autotransformer. The mixture was distilled through a fractionating column insulated over part of its length. The internal diameter of the fractionating column was 1 inch and the height was approximately 4 feet. The column was packed with ¼ inch Berl saddles. Reflux was provided by natural condensation occurring in the top uninsulated portion of the column. The pressure at the top of the column was maintained at about 30 lbs. per square inch gage to obtain a top temperature of about 100° C. All distillations were stopped upon recovery overhead of 40 milliliters of product. This volume was selected arbitrarily for all examples in order to facilitate comparison of the results. The following table summarizes the results of these distillations.

| Alcohol | Feed | | Overhead Product | | | Percent Recovery | Precipitate | |
|---|---|---|---|---|---|---|---|---|
| | wt. percent HCHO | wt. HCHO, g. | wt., g. | wt. percent HCHO | wt. HCHO, g. | | Room Temp. | 0° C. |
| 1. Ethanol | 20 | 21.2 | 32.4 | 31.4 | 10.2 | 48 | Yes | Yes. |
| 2. Ethanol | 10 | 10.3 | 32.4 | 16.0 | 5.1 | 50 | No | Yes. |
| 3. Isopropanol | 20 | 21.2 | 33.6 | 33.6 | 11.2 | 53 | Yes | Yes. |
| 4. Isopropanol | 10 | 10.3 | 32.8 | 16.8 | 5.5 | 53 | Yes | Yes. |
| 5. Normal Propanol | 20 | 21.2 | 35.6 | 36.8 | 13.1 | 62 | Yes | Yes. |
| 6. Normal Propanol | 10 | 10.3 | 34.8 | 20.1 | 7.0 | 68 | No | Yes. |
| 7. Tertiary Butanol | 20 | 21.2 | 33.2 | 34.6 | 11.5 | 54 | Yes | Yes. |
| 8. Tertiary Butanol | 10 | 10.3 | 33.2 | 18.0 | 6.0 | 58 | Yes | Yes. |

It will be noted that the weight percent of formaldehyde in the overhead product does not appear to be particularly high. It must be remembered, however, that this overhead product consists largely of alcohol with very little water present. Measurement of densities of the overhead products by means of a hydrometer indicated the ratio of alcohol to water was approximately the ratio in the azeotrope. Thus, the ratio of formaldehyde to water is extremely high in all cases. The only factor which prevented precipitation of formaldehyde polymer from solution at room temperature in Examples 2 and 6 was the high degree of solubility of the polymer in the alcohol, and the tendency of these low-molecular-weight alcohols to inhibit polymerization and precipitation of the formaldehyde polymer.

The percentage recovery of formaldehyde in all cases was rather low. This, of course, is due to the arbitrary cut-point of 40 milliliters of overhead product. In a continuous fractionating column such as a column 11 in Figure 1 and Figure 2 the provision of an adequate stripping section in the bottom of the column makes possible substantially complete recovery of the formaldehyde in the feed. Although both figures illustrate continuous processes it will be apparent that batch operations also come within the scope of my invention.

While the foregoing figures and examples illustrate advantageous embodiments of my invention it will be understood that I am not limited to the specific charging stocks, apparatus, or manipulative steps described therein. My invention is to be construed broadly within the terms of the appended claims interpreted in view of the specification. My invention is to be understood as including any modifications or equivalents that would ordinarily occur to those skilled in the art.

In accordance with the foregoing description I claim as my invention:

1. A method for concentrating aqueous solutions of formaldehyde comprising passing vapors of the formaldehyde and water upwardly through a fractionating column, providing a reflux in said column of a water-soluble alcohol selected from the group consisting of ethanol, isopropanol, normal propanol and tertiary butanol, while maintaining the temperature in said column at a temperature above about 80° C., and withdrawing from the top of said column a stream having a substantially increased ratio of formaldehyde to water.

2. A method for concentrating aqueous solutions of formaldehyde comprising passing vapors of the formaldehyde and water upwardly through a fractionating column, providing a reflux of ethanol in said column while maintaining the top temperature of said column above about 80° C., and withdrawing from the top of said column a stream having a substantially increased ratio of formaldehyde to water.

3. A method for concentrating aqueous solutions of formaldehyde comprising passing vapors of the formaldehyde and water upwardly through a fractionating column, providing a reflux of isopropanol in said column while maintaining the top temperature of said column above about 80° C., and withdrawing from the top of said column a stream having a substantially increased ratio of formaldehyde to water.

4. A method for concentrating aqueous solutions of formaldehyde comprising passing vapors of the formaldehyde and water upwardly through a fractionating column, providing a reflux of normal propanol in said column while maintaining the top temperature of said column above about 80° C., and withdrawing from the top of said column a stream having a substantially increased ratio of formaldehyde to water.

5. A method for concentrating aqueous solutions of formaldehyde comprising passing vapors of the formaldehyde and water upwardly through a fractionating column, providing a reflux of tertiary butanol in said column while maintaining the top temperature of said column above about 80° C., and withdrawing from the top of said column a stream having a substantially increased ratio of formaldehyde to water.

6. A method for concentrating aqueous solutions of formaldehyde comprising passing vapors of the formaldehyde and water upwardly through a fractionating column, providing a reflux of 2-methoxy ethanol in said column while maintaining the top temperature of said column above about 80° C., and withdrawing from the top of said column a stream having a substantially increased ratio of formaldehyde to water.

References Cited in the file of this patent

UNITED STATES PATENTS

| Number | Name | Date |
|---|---|---|
| 1,948,069 | Fuchs | Feb. 20, 1934 |
| 2,452,414 | Wong | Oct. 26, 1948 |
| 2,454,447 | Harney | Nov. 23, 1948 |
| 2,565,569 | McCants | Aug. 28, 1951 |